(12) United States Patent
Trolli et al.

(10) Patent No.: US 12,298,563 B2
(45) Date of Patent: May 13, 2025

(54) JOINT ASSEMBLY FOR POWER CABLES HAVING AN OPTICAL FIBER CABLE EMBEDDED AT DIFFERENT RADIAL POSITIONS, JOINT SYSTEM AND METHOD FOR INSTALLING SUCH A JOINT ASSEMBLY

(71) Applicant: PRYSMIAN S.p.A., Milan (IT)

(72) Inventors: Alessandro Trolli, Cavenago di Brianza (IT); Fabio D'Esposito, Meta di Sorrento (IT); Dario Bazzoli, Milan (IT); Enrico Maria Consonni, Seregno (IT)

(73) Assignee: PRYSMIAN S.p.A., Milan (IT)

( * ) Notice: Subject to any disclaimer, the term of this patent is extended or adjusted under 35 U.S.C. 154(b) by 69 days.

(21) Appl. No.: 18/331,776

(22) Filed: Jun. 8, 2023

(65) Prior Publication Data

US 2023/0400638 A1  Dec. 14, 2023

(30) Foreign Application Priority Data

Jun. 8, 2022  (IT) .................. 102022000012158

(51) Int. Cl.
| | | |
|---|---|---|
| *G02B 6/255* | (2006.01) | |
| *G02B 6/44* | (2006.01) | |
| *H01R 11/01* | (2006.01) | |
| *H02G 15/113* | (2006.01) | |

(52) U.S. Cl.
CPC .......... *G02B 6/2558* (2013.01); *G02B 6/4416* (2013.01); *G02B 6/4446* (2013.01); *G02B 6/4448* (2013.01); *H01R 11/01* (2013.01); *H02G 15/113* (2013.01)

(58) Field of Classification Search
CPC .. G02B 6/2558; G02B 6/4416; G02B 6/4448; G02B 6/4446; H02G 15/113; H01R 11/01; H01R 11/32
See application file for complete search history.

(56) References Cited

U.S. PATENT DOCUMENTS

| | | | |
|---|---|---|---|
| 7,584,597 B2* | 9/2009 | Blase .................... | F16G 13/16 59/80 |
| 2003/0026647 A1* | 2/2003 | Sasaki .................. | H02G 15/117 403/288 |
| 2010/0275570 A1* | 11/2010 | Hermey ............... | H02G 3/0475 138/120 |

(Continued)

FOREIGN PATENT DOCUMENTS

| | | |
|---|---|---|
| CN | 207967901 B1 | 10/2018 |
| DE | 4240171 A1 | 6/1994 |

(Continued)

*Primary Examiner* — Ryan A Lepisto
*Assistant Examiner* — Erin D Chiem
(74) *Attorney, Agent, or Firm* — Seed IP Law Group LLP

(57) ABSTRACT

Joint assembly for a first and a second power cables each comprising at least one optical fiber cable at a radial position different in the first and second power cables, the joint assembly comprising a two-halved inner shell and a two-halved outer shell extending along a longitudinal axis, wherein the two-halved inner shell is adapted to be arranged around a metallic layer of one of the first and second power cables, and the two-halved outer shell is adapted to be arranged around the two-halved inner shell.

15 Claims, 4 Drawing Sheets

(56) References Cited

U.S. PATENT DOCUMENTS

2016/0040803 A1\* 2/2016 Steeger ............... F16C 11/06
                                                                                           248/49
2021/0222819 A1\* 7/2021 Shiotani ............... F16L 57/06

FOREIGN PATENT DOCUMENTS

DE        19702804 C1   10/1998
KR       101216748 B1   12/2012

\* cited by examiner

JOINT ASSEMBLY FOR POWER CABLES HAVING AN OPTICAL FIBER CABLE EMBEDDED AT DIFFERENT RADIAL POSITIONS, JOINT SYSTEM AND METHOD FOR INSTALLING SUCH A JOINT ASSEMBLY

BACKGROUND

Technical Field

The present disclosure refers to a joint assembly for power cables having an optical fiber cable embedded at different radial positions, to a joint system and to a method for installing such a joint assembly.

Description of the Related Art

The power cables may be submarine power cables.

Typically, a power cable includes at least one cable core usually formed by an electrically conductive metal conductor covered by an insulation system. The insulation system comprises sequentially an inner semiconductive layer, an intermediate insulating layer, and an outer semiconductive layer. The layers of the insulating system may be made of polymeric material, of impregnated paper or of impregnated PPL (paper-polypropylene laminate).

The power cables usually include at least one metallic layer in radially outer position with respect to the insulation system. The metallic layer can be a metallic screen or a metallic barrier surrounding each cable core of the power cable so as to block water penetration during installation and operation of the cables. The metallic barrier, then, generally surrounds the insulation system and can be made of aluminum, lead or copper.

The metallic barrier can be made by extrusion, especially in case of a lead barrier, or in form of a longitudinally folded sheath with welded rims or overlapped and glued rims.

Furthermore, the metallic barrier may be covered by a polymeric, optionally semiconductive, sheath, for example a polyethylene sheath.

The power cables may comprise also a metallic armor surrounding the polymeric sheath in order to provide tensile strength and resistance to damages potentially caused, e.g., by anchors.

For example, the metallic armor can be made by a at least one layer of metallic wires helically wound around the polyethylene sheath. In case two armor layers are provided, one surrounding the other.

The metallic armor can then be surrounded by a serving layer in order to avoid abrasion. For example, the serving layer can be made by bituminous polypropylene yarns.

The metallic armor improves also the tensile strength of the cables that can be subject to very high tensile stress during the deployment or during the normal operation, for example, when a cable end does not lay on the seabed but is suspended underwater, exposed to motions of the sea water, like the sea currents and/or waves.

The power cables can be joined together in order to form a power line with an extension of many kilometers or in order to repair a damaged cable.

Cable joints are accessories used in an energy network to connect energy cables assuring the mechanical and electrical continuity and to restore the insulation and electric field control over the exposed junction between the conductors of the joined cables.

During assembly operation, all the layers surrounding the conductors are cut and removed at the ends of the cables to be joined, thus leaving exposed the conductor ends. The junction between the two respective exposed conductors is performed according to known procedures, for example by using a ferrule or a reinforced MIG welding or other similar methods involving ferrule and welding on both side and final mechanical connection.

Layers of materials having substantially the same electrical and mechanical properties and geometry of the removed layers are provided around the joined conductors according to known techniques.

The power cables can comprise one or more optical fiber cable, as a temperature sensor or for telecommunication purpose. An optical fiber cable can be provided in different positions of the power cable, for example within/in the vicinity of the electrically conductive metal conductor of the cable core or within/in the vicinity of any cable protecting layer.

Jointing two power cables comprising an optical fiber cable implies splicing the optical fibers too.

DE19702804 relates to a slip-on connecting sleeve for connecting plastic-insulated high and medium-voltage cables with optical fibers integrated in the conductor. A double-walled cylindrical contact body surrounds the conductor connection point and a splice space for the optical waveguides is arranged in the contact body.

U.S. Pat. No. 9,372,309 relates to a method for making a splice between optical fibers in a device for forming a joint between electrical cables. Since the first cable and the second cable have the same structure, the position of the first optical unit within the first cable is identical to the position of the second optical unit within the second cable. For example, in a high-voltage cable, the first optical unit (or second optical unit) may be inserted among the metal wires which form the metal screen of the first cable (or second cable). In order to join the first cable and the second cable together, their ends are cut so that the optical unit of each cable projects from the free end of the cable by a predetermined minimum length which enables the splices to be made between the optical fibers after the joint sleeve has been fitted on the ends of the first cable and the second cable.

In case the power cables to be joined have optical fiber cables in different positions, they are referred to as asymmetric power cables for descriptive purposes.

When the power cables to be joined are asymmetric, at least one of the optical fiber cables has to be moved from its position to be spliced. This could damage the optical fiber cable which has to be protected along its route to the splice. The optical fiber cable protection should not interfere with the connection of the other cable elements, and should not substantially increase the joint radial or longitudinal dimension.

BRIEF SUMMARY

The disclosure provides a joint between two asymmetric power cables. In some implementations, the disclosure provides a joint between a first power cable in which a first optical fiber cable is in the metallic armor, and a second power cable in which a second optical fiber cable is provided in radially adjacent position with respect to a metallic layer (e.g., embedded in a protecting layer surrounding a metallic water barrier).

In some implementations, at least one of the optical fiber cables, for example, the second optical fiber cable as located in a radially inner position with respect to the position of the first optical fiber cable, has to be moved from its position to be spliced with the above-mentioned risks and inconveniences.

Then the Applicant faced the problem of providing a joint assembly for asymmetric power cables capable of defining a protected route for their relevant optical fiber cables allowing the splicing between them.

The Applicant creates a protected route for passing the second optical cable (the radially innermost one) and another radially external protected route for passing the first optical cable. In some implementations, the Applicant envisaged protected route for the passage of the optical fiber cables, said route passing along and/or through one or more shells provided in radial external position with respect to the radially innermost optical fiber cables.

According to a first aspect, the present disclosure relates to a joint assembly for a first and a second power cables each comprising at least one optical fiber cable at a radial position different in the first and second power cables, said joint assembly comprising:
 a two-halved inner shell and a two-halved outer shell extending along a longitudinal axis, wherein:
 the two-halved inner shell is adapted to be arranged around a metallic layer of one of the first and second power cables, and the two-halved outer shell is adapted to be arranged around the two-halved inner shell;
 at least one half of the two-halved inner shell comprises a first though hole and a first groove in its radially inner surface, the first groove running in a first direction from the first through hole to one longitudinal end of said at least one half;
 at least one half of the two-halved outer shell comprises a second through hole and a second groove in its radially outer surface, the second groove running in a second direction from the second through hole to one longitudinal end of said at least one half; and
 in an assembled configuration the first through hole and the second through hole are substantially superposed to create a single passage, and the second direction is opposite to the first direction.

In an embodiment the two-halved inner shell is made of a metal chemically compatible with the metal of the metallic layer of the power cable around which it is meant to be arranged.

In this way the two-halved inner shell can be soldered to the metallic layer avoiding the risk of relative movement between them and the consequent risk of damage of the optical fiber cable of this power cable.

The two halves of the two-halved inner shell are configured to be bonded one another.

In an embodiment the two-halved outer shell is made of a metal chemically compatible with the metal of a metallic armors the power cables. In this way the metallic armor can be bonded to the two-halved outer shell restoring the resistance to tensile stresses performed by the armor and avoiding the consequent risk of damage of the power cable/s.

In the present description and claims, the verb "to bond" and its forms stay for "to weld" or "to solder" or "to braze" and their relevant forms. The skilled person will understand which bonding technique is applicable in view of the materials to be bonded one another, which are all included in the scope of the disclosure.

In an embodiment the two-halved outer shell comprises one or more through seats in corresponding positions so that when the two halves are placed one on top of the other two respective through seats form a single through channel. In each through channel a respective centering and tightening pin may be inserted.

In an embodiment each half of the two-halved outer shell has a central portion having a first radius and two first opposite side portions, adjacent to the central portion, having a second radius smaller than the first radius.

In an embodiment each half of the two-halved outer shell comprises also two second opposite side portions, adjacent to the first opposite side portions, having a third radius smaller than the second radius.

In an embodiment the joint assembly comprises a junction box configured to house the connection between the optical fiber cables of the power cables.

In another aspect the present disclosure relates to a joint system for power cables comprising:
 a first and a second power cables, each one comprising a cable core, a metallic layer arranged in a radially outer position with respect to the cable core, a polymeric sheath arranged in a radially outer position with respect to the metallic layer, and a metallic armor made of elongated elements and arranged in a radially outer position with respect to the polymeric sheath, wherein the first power cable has a first optical fiber cable among the elongated elements of the metallic armor, and the second power cable has a second optical fiber cable positioned in radial outer position with respect to the metallic layer and in direct contact thereto or embedded in the polymeric sheath surrounding and directly contacting the metallic layer, the first and second power cables being electrically joined;
 a joint assembly comprising:
  a two-halved inner shell bonded around and to the metallic layer of one of the first and second power cable, and comprising a first through hole and a first groove in its radially inner surface, the first groove running in a first direction and
  a two-halved outer shell arranged around the two-halved inner shell, and comprising a second through hole and a second groove in its radially outer surface, the second through hole being substantially superposed to the first through hole to create a single passage, and the second groove running in a second direction opposite to the first direction;
 the second optical fiber cable passing in the first groove and through the first and the second through hole, the first optical fiber cable passing in the second groove and being spliced to the second optical fiber cable; and
 the elongated elements of the metallic armors being bonded onto the two-halved outer shell at each side of the second through hole and of the second groove.

In an embodiment a reinforcing metal tape is wound at each side of the first through hole.

In an embodiment, the two-halved inner shell is made of a metal chemically compatible with that of the metallic layer around which it is bonded.

In an embodiment, the two-halved outer shell is made of a metal chemically compatible with that of the metallic armors elongated elements bonded thereonto.

In the present description and claims as "chemically compatible" means that the metals of two-halved inner shell and metallic layer may pass a bonding test like the Mil-Std-883 Method 2003, and that the metals of the two-halved outer shell and metallic armors elongated elements are known to provide a safe bond according to the general knowledge (see, for example, https://www.ullrich-aluminium.co.nz/pdfs/Brochure_pdfs/Bolt-Compatibility-Chart.pdf, or R. L. Klueh et al., Welding Research Supplement, 154-159 June 1983).

In an embodiment the two-halved outer shell has a central portion and two first opposite side portions adjacent to the central portion, and the elongated element of the metallic armors are welded onto the first opposite side portions.

In an embodiment, when at least one of the first and second power cable has a metallic armor with elongated elements arranged in an inner and an outer layer radially superposed, the two-halved outer shell comprises also two second opposite side portions adjacent to the first opposite side portions. The elongated elements of the armor inner layer are bonded onto the second opposite side portions and the elongated elements of the outer layer are bonded onto the first opposite side portions.

In a further another aspect the present disclosure relates to a method for installing a joint assembly comprising the steps of:
  providing a first and a second power cables, each one comprising a cable core, a metallic layer in a radially outer position with respect to the cable core, a polymeric sheath in a radially outer position with respect to the metallic layer and a metallic armor, made of elongated elements, in a radially outer position with respect to the polymeric sheath, wherein the first power cable has a first optical fiber cable among the elongated elements of the metallic armor and the second power cable has a second optical fiber cable positioned between the metallic layer and the polymeric sheath;
  electrically joining the first power cable and the second power cable;
  on an exposed length of the metallic layer of one of the first and second power cable, the exposed length being at a distance from the electrical junction, passing the second optical fiber cable in a first groove provided in a radially inner surface of a two-halved inner shell and through a first through hole in the two-halved inner shell;
  bonding the two-halved inner shell around and to the exposed length of the metallic layer;
  restoring the polymeric sheath of each of the first power cable and second power cable aside and, optionally, on the two-halved inner shell leaving at least the first through hole uncovered;
  providing a two-halved outer shell having a second through hole and a second groove;
  passing the second optical fiber cable through the second through hole;
  fitting the two-halved outer shell around the two-halved inner shell so that the second through hole is superposed to the first through hole to create a single passage;
  passing the first optical fiber cable in the second groove and splicing the first optical fiber cable to the second optical fiber cable; and
  bonding the elongated elements of the metallic armors onto the two-halved outer shell.

In an embodiment, after the bonding of the two-halved inner shell and before the fitting of the two-halved outer shell, the method comprises the step winding and two reinforcing metallic tapes one per side of the first through hole. The reinforcing tapes can be wound around the polymeric sheath once restored.

For the purpose of the present description and of the claims that follow, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

As "insulating layer" it is meant a layer made of a material having a conductivity comprised between 10-16 and 10-14 S/m.

As "semiconductive layer" it is meant a layer made of a material having a conductivity comprised between 10-1 and 10 S/m.

BRIEF DESCRIPTION OF THE SEVERAL VIEWS OF THE DRAWINGS

Further characteristics will be apparent from the detailed description given hereinafter with reference to the accompanying drawings, in which.

DETAILED DESCRIPTION

With reference to the figures, a joint system 10 according to the present disclosure is schematically represented.

Figure 2A:
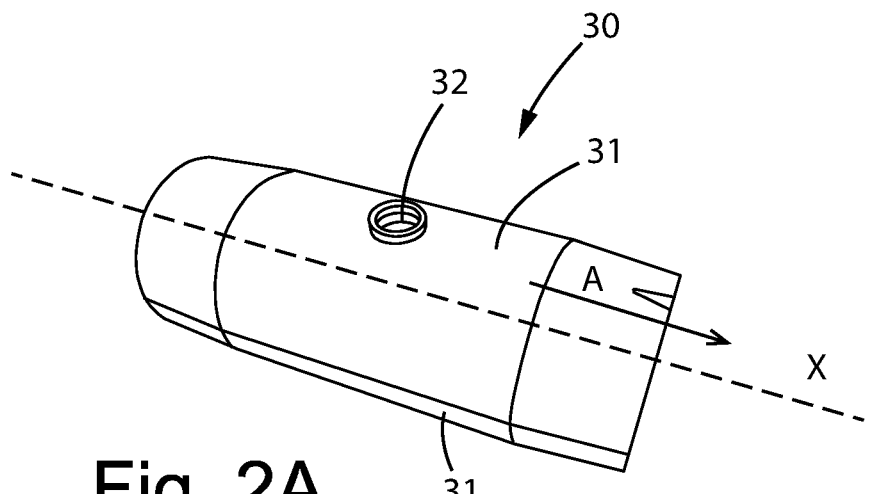
FIG. 2A is a schematic perspective view of a two-halved inner shell of a joint system according to the present disclosure.
Figure 2B:
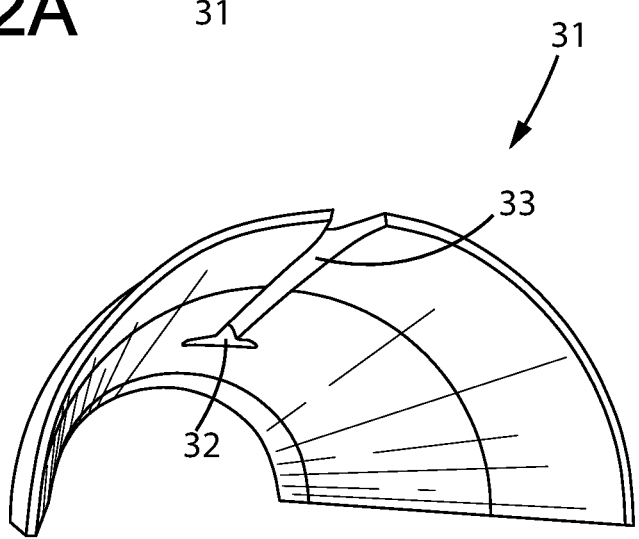
FIG. 2B is a schematic perspective view of one half of the two-halved inner shell of FIG. 2A.
Figure 3:
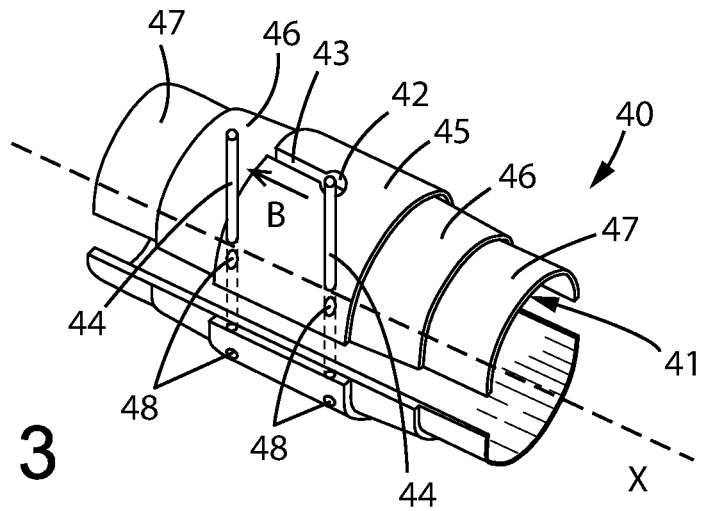
FIG. 3 is a schematic perspective view of a two-halved outer shell of a joint system according to the present disclosure.

In some implementations, the joint system 10 comprises a joint assembly (the portions of which are shown in FIGS. 2A, 2B and 3) in an assembled configuration on two electrically joined power cables 100, 200, e.g., a first 100 and a second 200 power cable extending along a longitudinal axis X.

Each first and second power cables 100, 200 comprises a cable core 110, 210 a metallic layer 120, 220 arranged in a radially outer position with respect to the cable core 110, 210. A polymeric sheath 130, 230 is arranged in a radially outer position with respect to the metallic layer 120, 220 and a metallic armor 142, 242 arranged in a radially outer position with respect to the polymeric sheath 130, 230.

The cable core 110, 210 comprises an electric conductor 111, 211 surrounded by an electrically insulating system comprising an inner semiconductive layer 112, 212 arranged in a radially outer position with respect to the electric conductor 111, 211, an insulating layer 113, 213 arranged in a radially outer position with respect to the inner semiconductive layer 112, 212, and an outer semiconductive layer 114, 214 arranged in a radially outer position with respect to the insulating layer 113, 213.

A bedding layer (not illustrated), for example of a polymer material, may be present between the metal layer 120, 220 and the metallic armor 142, 242. When the power cable comprises more than one electric conductors, its cable core may also comprise a filler embedding all the electric conductors and the just mentioned layers surrounding them.

For example, the first and second power cables 100, 200 can be a single core cable or a multi-core cable comprising a plurality of cores, for example three cores.

For example, the metallic layer 120, 220 can be made of aluminum, lead or copper.

For example, the metallic layer 120, 220 can be made by extrusion, e.g., in case of a lead layer, or in form of a longitudinally folded sheath with welded rims or overlapped and glued rims, or in form of a wound tape or wires, or in the form of braids.

The metallic layer 120, 220 may be an electric screen, e.g., made of aluminum or copper, or a water barrier, e.g., made of aluminum, lead or copper. When the metallic layer 120, 220 is a water barrier, the cable core 110, 210 further comprise an electric screen in radially outer position and in electrical contact to the outer semiconductive layer 114, 214.

For example, the polymeric sheath 130, 230 can be a polyethylene sheath and can also be semiconductive.

Figure 1A:
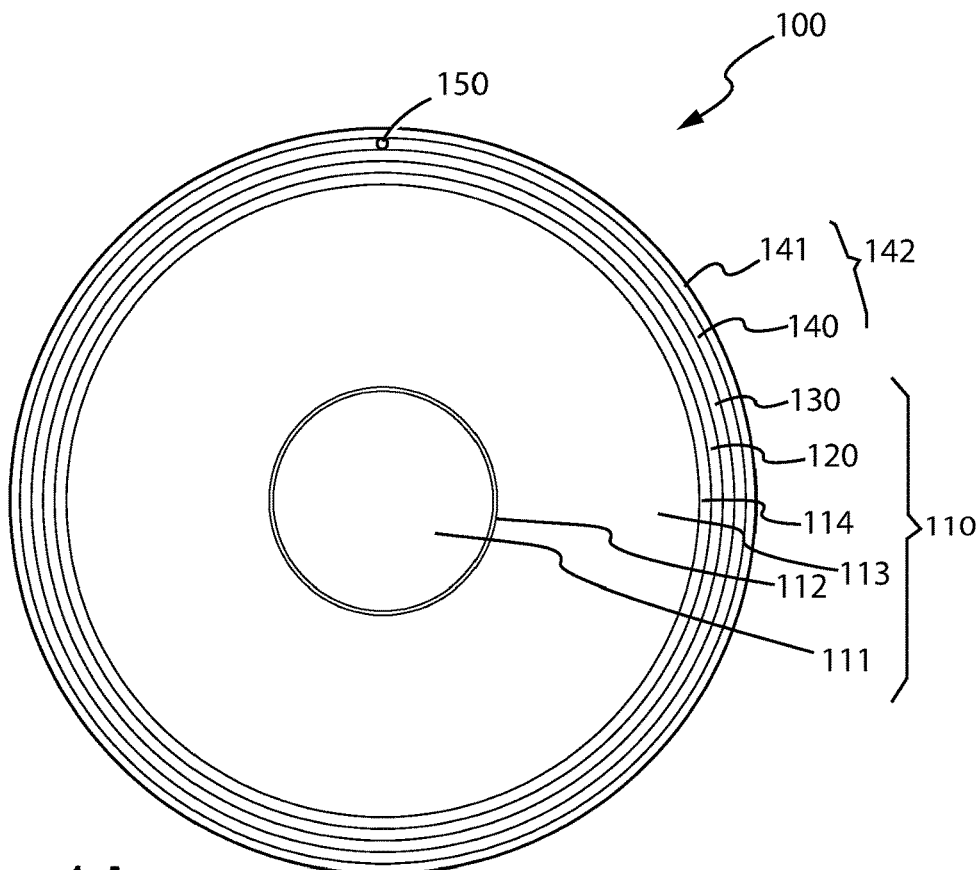
FIG. 1A is a schematic cross-section of a first power cable.
Figure 1B:
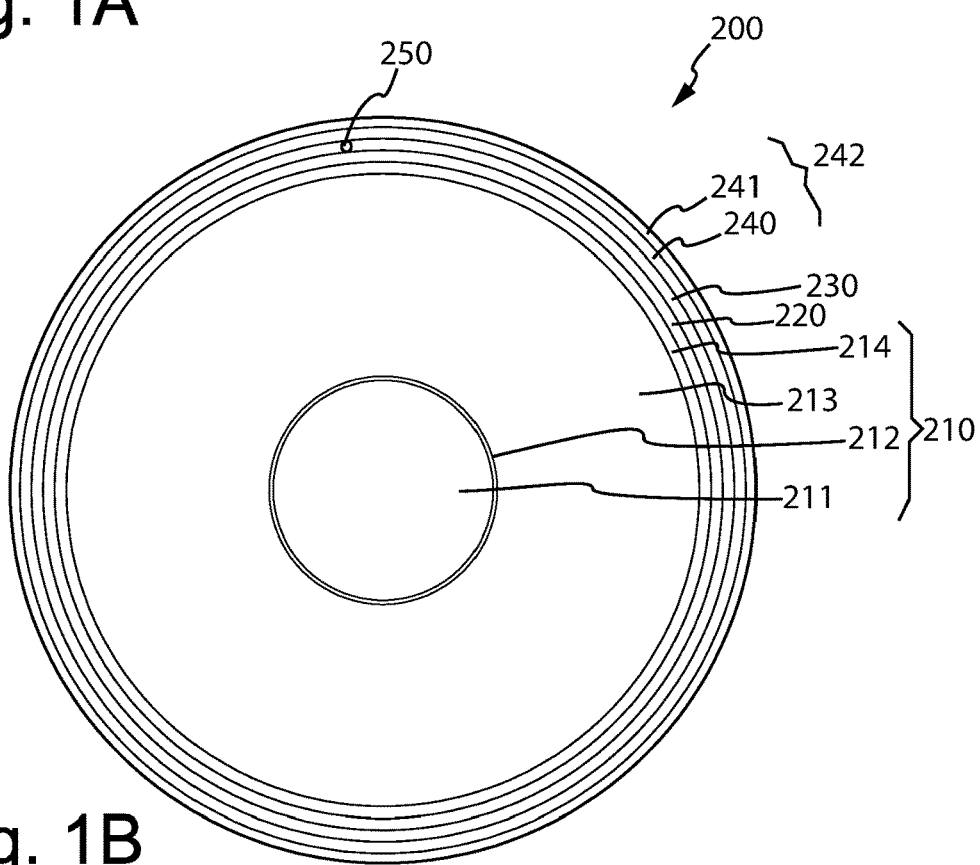
FIG. 1B is a schematic cross-section of a second power cable.

In the embodiment of FIGS. 1A, 1B, each of the first and second power cables 100, 200 has a metallic armor 142, 242 in form of two layers of elongated elements, in articular an inner layer 140, 240 and an outer layer 141, 241 radially superposed.

In an embodiment, only one of the first and second power cable 100, 200 has the metallic armors 142, 242 made of two layers 140, 141, 240, 241, whereas the other of the first and second power cable has the metallic armor 142, 242 made of just one layer 140, 240.

The metallic armor 142, 242 is made by a plurality of elongated elements helically wound around the polymeric sheath 130, 230 or around the bedding layer if present. The elongated elements are made of a metal or a metal alloy or composite such as stainless steel, ferromagnetic steel, galvanized steel or copper. The elongated elements can be in form of wires having a substantially round cross-section or a flat cross-section.

The metallic armor 142, 242 can be surrounded by a serving layer (not illustrated) in order to avoid abrasion. For example, the serving layer can be made by bituminous polypropylene yarns.

The first power cable 100 has a first optical fiber cable 150 provided in the metallic armor 142, for example, in the inner layer 140, wound around the cable core among the elongated elements of the armor layer, and the second power cable 200 has a second optical fiber cable 250 embedded, in the present case, in the polymeric sheath 230 surrounding and directly contacting the metallic layer 220.

The optical fiber cable 150, 250 may comprise one or more optical fibers contained in a sheath. The optical fibers comprise an optical waveguide, generally of glass, and one or more protective layers, generally made of polymeric material. The optical fiber cable sheath may be made of polymeric material or of metal. A water-blocking and/or hydrogen absorbing material may be contained in the optical fiber cable sheath.

During junction operation, the end portion of each power cable 100, 200 to be electrically connected is peeled so as to expose a tract of the core electric conductor 111, 211. The junction is then performed according to known procedures between the two respective exposed electric conductors. The layers cable core 110, 210 and the metallic layer 120, 220 surrounding the joined electric conductors are then restored according to known techniques.

In the depicted embodiment, the joint assembly is installed on the second power cable 200 at a certain distance from the electric joint (not illustrated). In some embodiments, the joint assembly may be positioned on the first cable, the choice of the installation point of the joint assembly depending of factors such as the original positioning of the optical cables in the respective power cables.

The joint assembly comprises a two-halved inner shell 30 and a two-halved outer shell 40 extending along the longitudinal axis X. The two-halved inner shell 30 is adapted to be arranged around the metallic layer, the present case the metallic layer 220, whereas the two-halved outer shell 40 is adapted to be arranged around the two-halved inner shell 30.

As from FIGS. 2A, 2B, at least one half 31 of the two-halved inner shell 30 comprises a first though hole 32 and a first groove 33 in its inner surface running along the longitudinal axis X in a first direction A from the first through hole 32 to one longitudinal end 34 of the at least one half 31. In an embodiment, the longitudinal end 34 is that facing the extraction point of the second optical fiber cable 250.

The two-halved inner shell 30 is soldered around the metallic layer 220. The two-halved inner shell is made of a metal chemically compatible with the metal of the metallic layer. For example the two-halved inner shell can be made of copper or copper alloy, or brass or bronze when the metallic layer is made of copper, aluminum, lead or alloys thereof. The material of the two-halved inner shell is selected to be chemically compatible to that of the underlying metallic layer.

As from FIG. 3, at least one half 41 of the two-halved outer shell 40 comprises a second through hole 42 and a second groove 43 through its outer surface extends along the longitudinal axis X from the second through hole in a second direction B opposite to the first direction A.

The two-halved outer shell 40 is made of a metal chemically compatible with the metal of the metallic armors 142, 242 of the both the power cables 100, 200. For example the two-halved outer shell 40 can be made of steel, copper or copper alloy, or brass or bronze. The material of the two-halved outer shell is selected to be chemically compatible to that of the armors to be bonded thereto.

Each half of the two-halved outer shell 40 comprise one or more through seats 48 in corresponding positions so that when one half is placed on top of the other the respective through seats form a single through channel. In each through channel a respective centering and tightening pin 44 is inserted assuring the correct positioning and the stable coupling between the two-halves.

The two-halved outer shell 40 is arranged around the two-halved inner shell 30 so that the second through hole 42 is superposed to the first through hole 32 to create a single passage.

Each half of the two-halved outer shell 40 has a central portion 45 having a first radius and two first opposite side portions 46 adjacent to the central portion 45 having a second radius smaller than the first radius.

In the embodiment of FIG. 3, each half of the two-halved outer shell 40 comprises also two second opposite side portions 47 adjacent to the first opposite side portions 46 having a third radius smaller than the second radius.

The joint assembly can comprise a junction box 300 configured to make the connections between the optical fiber cables 150, 250.

The provision of the joint assembly onto the joined first and second power cables 100, 200 is carried as follows.

Figure 4A:
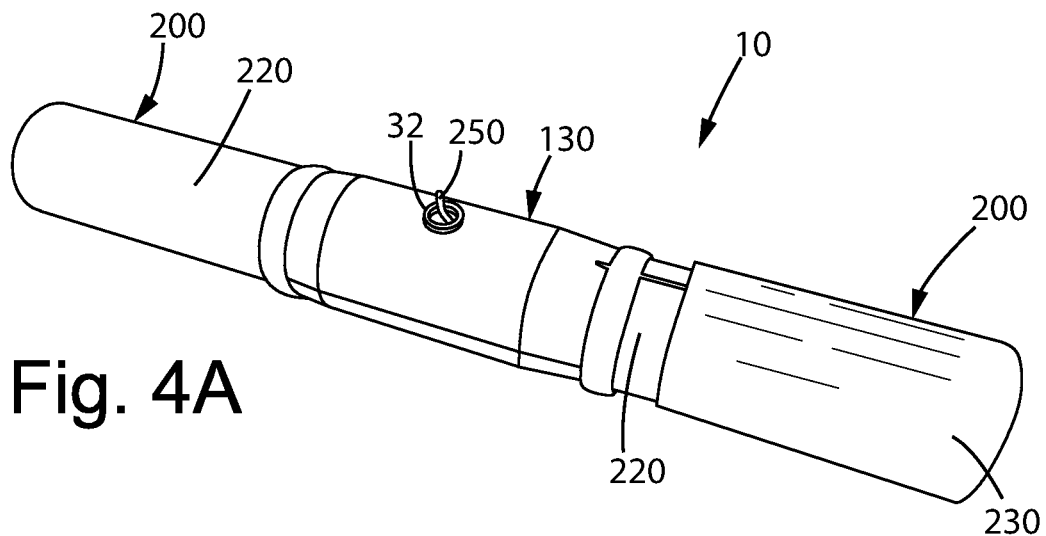
FIGS. 4A, 4B, 4C, 4D, 4E are five schematic perspective views that illustrate five subsequent steps of the installation a joint assembly according to the present disclosure.

The second optical fiber cable 250 is extracted from the polymeric sheath 230 of the second power cable 200 and made to pass in the first groove 33 and through the first through hole 32, and the halves of the two-halved inner shell 30 are bonded onto the metallic layer. FIG. 4A shows the embodiment where the two-halved inner shell 30 is bonded onto the metallic layer 220 of the second power cable 200.

Figure 4B:
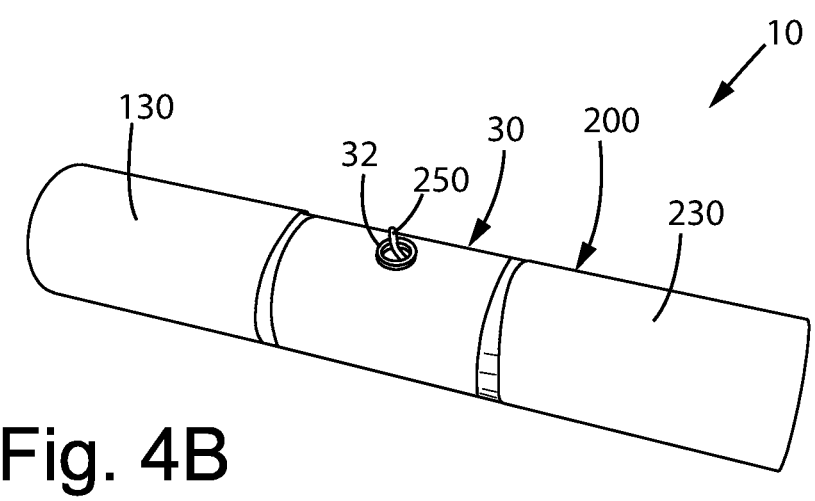

As from FIG. 4B, an illustrative embodiment is shown where the position selected for the optical fiber cable splice is on the second power cable 200. The polymeric sheath 130, 230 is restored around the metallic layer 220 on opposite sides on the two-halved inner shell 30 leaving at least the first through hole 32 uncovered.

Figure 4C:
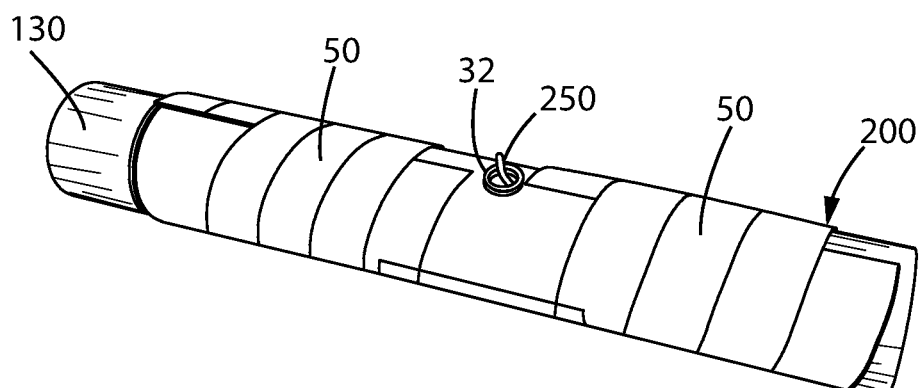

As from FIG. 4C, a reinforcing metallic tape 50 can be wrapped on the two-halved inner shell 30 and on the polymeric sheath 230 of the present embodiment, leaving at least the first through hole 32 uncovered.

For example, the reinforcing metallic tape 50 can be made of steel.

Figure 4D:
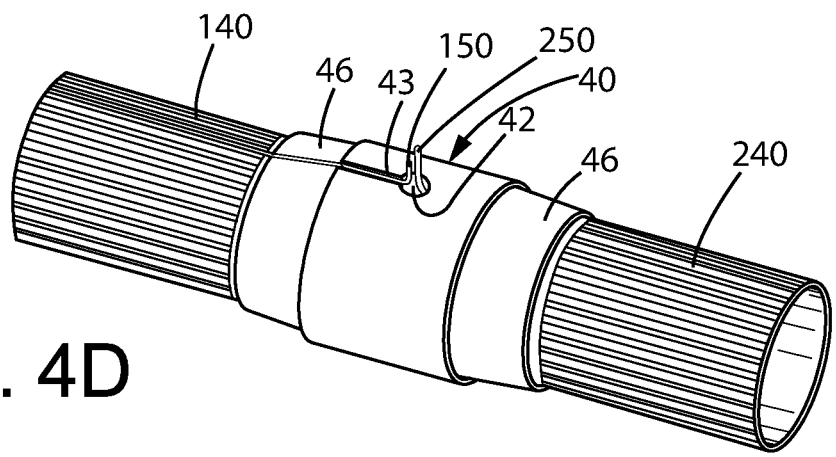
Figure 4E:
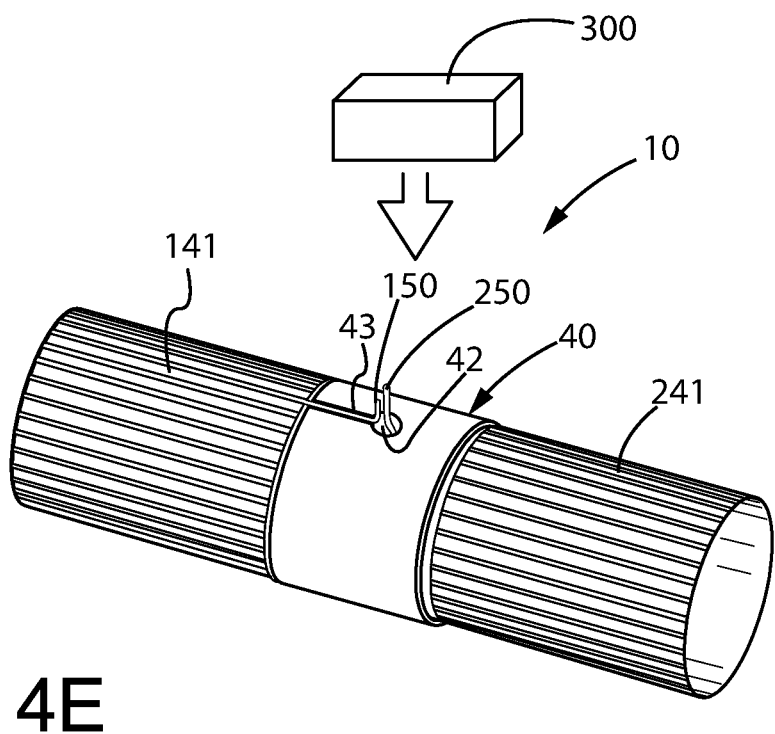

As from FIG. 4D, the second optical fiber cable 250 is made to pass through the second through hole 42, and the halves of the two-halved outer shell 40 are arranged around the two-halved inner shell 30 so that the second through hole 42 is superposed to the first through hole 32 to create a single passage. Though not shown, the two-halved outer shell 40 is provided with the pins 44 mentioned above.

In the depicted embodiment the two-halved outer shell 40 is arranged around and in contact with the reinforcing metallic tape 50.

The first optical fiber cable 150 is isolated from elongated elements of the armor, e.g., of the inner layer 140, of the first power cable 100 and made to pass in the second groove 33 until reaching the second optical fiber cable 250 emerging through the second through hole 42 in order to be spliced to the second optical fiber cable 250.

The elongated elements of the metallic armors of the first and second power cables 100, 200 are welded onto the two-halved outer shell. In the present embodiment, elongated elements of the inner layers 140, 240 are welded onto the second opposite side portions 47 and the outer layers 141, 241 are welded onto the first opposite side portions 46 of the two-halved outer shell 40.

The joint assembly of the present disclosure provides protected routes for the optical fiber cables of joined asymmetric power cables. For example, the protected routes are created via a system of two-halved shells to be superposed one another, each two-halved shell having grooves and through-holes for the safe passage of the optical fibers cables.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A joint assembly for a first and a second power cables each comprising at least one optical fiber cable at a radial position different in the first and second power cables, the joint assembly comprising:
   a two-halved inner shell and a two-halved outer shell each extending along a longitudinal axis,
   wherein:
      the two-halved inner shell is adapted to be arranged around a metallic layer of one of the first or second power cables, and the two-halved outer shell is adapted to be arranged around the two-halved inner shell;
      at least one half of the two-halved inner shell comprises a first though hole and a first groove in its radially inner surface, the first groove running in a first direction from the first through hole to a longitudinal end of the at least one half of the two-halved inner shell; and
      at least one half of the two-halved outer shell comprises a second through hole and a second groove in its radially outer surface, the second groove running in a second direction from the second through hole to a longitudinal end of the at least one half of the two-halved outer shell,
   wherein in an assembled configuration the first through hole and the second through hole are substantially superposed to create a single passage, and the second direction is opposite to the first direction.

2. The joint assembly according to claim 1, wherein the metallic layer is made of a first metal, and the two-halved inner shell is made of a second metal chemically compatible with the first metal of the metallic layer of the power cables around which it is meant to be arranged.

3. The joint assembly according to claim 1, wherein the two halves of the two-halved inner shell are configured to be bonded to one another.

4. The joint assembly according to claim 1, wherein each of the first and second power cables has a metallic armor made of a first metal, and the two-halved outer shell is made of a second metal chemically compatible with the first metal of the metallic armors of both the power cables.

5. The joint assembly according claim 1, wherein two halves of the two-halved outer shell each comprises one or more through seats in corresponding positions so that when the two halves are placed one on top of another, two corresponding through seats of the two halves form a single through channel, to which a respective centering and tightening pin is configured to be inserted.

6. The joint assembly according to claim 1 comprising a junction box configured to make the connections between the optical fiber cables of the power cables.

7. The joint assembly according to claim 1, wherein each half of the two halves of the two-halved outer shell has a central portion having a first radius and two first side portions adjacent to the central portion, the two first side positions being opposite to one another and each having a second radius smaller than the first radius.

8. The joint assembly according to claim 7, wherein each half of the two halves of the two-halved outer shell comprises two second side portions adjacent to the first side portions, respectively, the two second side portions being opposite to one another and each having a third radius smaller than the second radius.

9. A joint system for power cables comprising:
a first and a second power cables, each comprising a cable core, a metallic layer arranged in a radially outer position with respect to the cable core, a polymeric sheath arranged in a radially outer position with respect to the metallic layer, and a metallic armor made of elongated elements and arranged in a radially outer position with respect to the polymeric sheath, wherein the first power cable has a first optical fiber cable among the elongated elements of the metallic armor and the second power cable has a second optical fiber cable positioned in radial outer position with respect to the metallic layer and in direct contact thereto or embedded in the polymeric sheath that surrounds and in directly contact to the metallic layer, the first and second power cables being electrically joined;
a joint assembly comprising:
  a two-halved inner shell bonded around and to the metallic layer of one of the first or second power cable, and comprising a first through hole and a first groove in its radially inner surface, the first groove running in a first direction, and
  a two-halved outer shell arranged around the two-halved inner shell, and comprising a second through hole and a second groove in its radially outer surface, the second through hole being substantially superposed to the first through hole to create a single passage, and the second groove running in a second direction opposite to the first direction,
wherein the second optical fiber cable passes in the first groove and through the first and second through hole,
the first optical fiber cable passes in the second groove and is spliced to the second optical fiber cable; and
the elongated elements of the metallic armors are bonded onto the two-halved outer shell at each side of the second through hole and at each side of the second groove.

10. The joint system according to claim 9 comprising a reinforcing metallic tape wound at each side of the first through hole.

11. The joint system according to claim 9, wherein the two-halved outer shell has a central portion and two opposite first side portions adjacent to the central portion, and the elongated element of the metallic armors are welded onto the first side portions.

12. The joint system according to claim 11, wherein, at least one of the first or second power cable has a metallic armor with elongated elements arranged in an inner and an outer layer radially superposed, the two-halved outer shell comprises two opposite second side portions adjacent to the first side portions, respectively, the elongated elements of the armor inner layer are bonded onto the second side portions, and the elongated elements of the armor outer layer are bonded onto the first side portions.

13. A method for installing a joint assembly comprising:
providing a first and a second power cables, each comprising a cable core, a metallic layer in a radially outer position with respect to the cable core, a polymeric sheath in a radially outer position with respect to the metallic layer and a metallic armor made of elongated elements and in a radially outer position with respect to the polymeric sheath, wherein the first power cable has a first optical fiber cable among the elongated elements of the metallic armor and the second power cable has a second optical fiber cable positioned between the metallic layer and the polymeric sheath;
electrically joining the first power cable and the second power cable;
on an exposed length of the metallic layer of one of the first or second power cable at a distance from the electrical junction, passing the second optical fiber cable in a first groove provided in a radially inner surface of a two-halved inner shell and through a first through hole in the two-halved inner shell;
bonding the two-halved inner shell around and to the exposed length of the metallic layer;
restoring the polymeric sheath of each of the first and second power cable;
providing a two-halved outer shell having a second through hole and a second groove;
passing the second optical fiber cable in the second through hole;
fitting the two-halved outer shell around the two-halved inner shell so that the second through hole is superposed to the first through hole to create a single passage;
passing the first optical fiber cable in the second groove and splicing the first optical fiber cable to the second optical fiber cable; and
bonding the elongated elements of the metallic armor onto the two-halved outer shell.

14. The method according to claim 13 comprising winding two reinforcing metallic tapes one per side of the first through hole, after the bonding of the two-halved inner shell and before the fitting of the two-halved outer shell.

15. The method according to claim 13, wherein the restoring the polymeric sheath of each of the first and second power cable includes on the two-halved inner shell, leaving at least the first through hole uncovered.

* * * * *

UNITED STATES PATENT AND TRADEMARK OFFICE
CERTIFICATE OF CORRECTION

PATENT NO. : 12,298,563 B2
APPLICATION NO. : 18/331776
DATED : May 13, 2025
INVENTOR(S) : Alessandro Trolli et al.

Page 1 of 1

It is certified that error appears in the above-identified patent and that said Letters Patent is hereby corrected as shown below:

In the Claims

Column 10, Claim 1, Line 18:
"a first though hole" should read: --a first through hole--.

Column 10, Claim 5, Line 46:
"assembly according claim 1," should read: --assembly according to claim 1,--.

Signed and Sealed this
Sixteenth Day of September, 2025

Coke Morgan Stewart
*Acting Director of the United States Patent and Trademark Office*